US010509444B2

(12) United States Patent
Luo et al.

(10) Patent No.: US 10,509,444 B2
(45) Date of Patent: *Dec. 17, 2019

(54) POS MACHINE AND DOCKING STATION THEREOF

(71) Applicant: PAX COMPUTER TECHNOLOGY (SHENZHEN) CO., LTD., Shenzhen, Guangdong (CN)

(72) Inventors: Shaowen Luo, Guangdong (CN); Chenghe Yang, Guangdong (CN); Jigui Li, Guangdong (CN)

(73) Assignee: PAX COMPUTER TECHNOLOGY (SHENZHEN) CO., LTD., Shenzhen, Guangdong (CN)

( * ) Notice: Subject to any disclaimer, the term of this patent is extended or adjusted under 35 U.S.C. 154(b) by 87 days.

This patent is subject to a terminal disclaimer.

(21) Appl. No.: 15/744,111

(22) PCT Filed: Aug. 3, 2017

(86) PCT No.: PCT/CN2017/095854
§ 371 (c)(1),
(2) Date: Jan. 12, 2018

(87) PCT Pub. No.: WO2019/000558
PCT Pub. Date: Jan. 3, 2019

(65) Prior Publication Data
US 2019/0004572 A1    Jan. 3, 2019

(30) Foreign Application Priority Data

Jun. 30, 2017  (CN) .................... 2017 2 0789053 U

(51) Int. Cl.
*G06F 1/18*  (2006.01)
*G06F 1/16*  (2006.01)
(Continued)

(52) U.S. Cl.
CPC ............ *G06F 1/182* (2013.01); *G06F 1/1601* (2013.01); *G07G 1/0045* (2013.01); *G07G 1/14* (2013.01)

(58) Field of Classification Search
CPC ...... G06F 1/1632; G06F 1/182; G06F 1/1601; G07G 1/14; G07G 1/0045; G07G 1/009
See application file for complete search history.

(56) References Cited

U.S. PATENT DOCUMENTS

2016/0005020 A1* 1/2016 Fernando ................ G06F 3/048
705/21
2016/0231779 A1* 8/2016 Kaneko .................. G06F 1/1632
(Continued)

FOREIGN PATENT DOCUMENTS

CN         205428065 U  *  8/2016

OTHER PUBLICATIONS

CN 205428065U Machine Translation (Year: 2019).*
(Continued)

*Primary Examiner* — Jinhee J Lee
*Assistant Examiner* — Ingrid D Wright
(74) *Attorney, Agent, or Firm* — Rankin, Hill & Clark LLP

(57) ABSTRACT

The present application provides a docking station and a POS machine using the same. The docking station includes a housing, a mainboard mounted inside the housing, a display device mounted on the housing, and a support configured to detachably support a card swiping device; the display device is mounted on the housing, the support is fixed on the housing, a data plug for connecting with the card swiping device is mounted inside the support, and the data plug is electrically connected with the mainboard. Such that the function of the card swiping device can be expanded and the docking station of the card swiping device is formed. By (Continued)

using the support to support the card swiping device, the occupied space can be reduced, and the use is convenient.

15 Claims, 12 Drawing Sheets

(51) Int. Cl.
  *G07G 1/00* (2006.01)
  *G07G 1/14* (2006.01)

(56) References Cited

U.S. PATENT DOCUMENTS

2017/0076269 A1* 3/2017 Saeed ................ G06Q 20/3224
2017/0206750 A1* 7/2017 Baitz ...................... F16M 11/10

OTHER PUBLICATIONS

KR1020150021655 A Machine Translation with Drawings (Year: 2019).*
KR1020150021655 A Secondary Translation (Year: 2019).*

* cited by examiner

POS MACHINE AND DOCKING STATION THEREOF

TECHNICAL FIELD

The present application relates to the technical field of point of sale (POS) machines, and more particularly to a docking station and a POS machine using the same.

BACKGROUND

Merchants adopt POS machines generally for bringing guests with convenience in swiping card for consumption. When the POS machine is used to swipe card for consumption, it is often only able to display the payment information, but not necessary to display the consumption details. When the merchants or guests need to check the consumption detail, the merchants need to adopt a specialized server and display by a display screen of the server. Moreover, when the guests use the POS machine for payment, the merchants are required to confirm the payment in the server, which is not convenient. When the swiping card for payment and the confirmation of the server are required to be synchronous, an individual connection wire is generally necessitated to connect the POS machine with the server at present, so that the server can confirm and display synchronously when swiping a card for payment. This requires the merchants to use the POS machine and a supporting server, thus resulting in a large occupied space, and the position of the POS machine is limited, the use is inconvenient, and the cost is relatively high.

SUMMARY

It is an object of the present application to provide a docking station, which solves the problems of large occupied space, inconvenient use, and high cost of the POS machine and the server in the prior art.

To achieve the object, the present application adopts the following technical solution: a docking station is provided. The docking station comprises: a housing, a mainboard mounted inside the housing, a display device mounted on the housing, and a support configured to detachably support a card swiping device; wherein the display device is mounted on the housing, the support is fixed on the housing, a data plug configured for connecting with the card swiping device is mounted inside the support, and the data plug is electrically connected with the mainboard.

Further, the support defines therein an accommodation recess configured to fittingly accommodate the card swiping device.

Further, the display device comprises a first display and a second display; the first display is electrically connected with the mainboard, a front side of the housing defines an arc-shaped opening; the housing comprises: a base, a frame bending and extending forwardly from an upper end of the base, and a bracket inclinedly extending downwardly from a front end of the frame; the mainboard is mounted inside the base, the first display is mounted on the bracket, and the second display is mounted on the upper end of the base.

Further, a lower part of the base comprises an accommodation chamber, a printer is mounted in the accommodate chamber, and the printer is electrically connected with the mainboard.

Further, a rear side of the base defines a mounting port at a position corresponding to the printer, and a cover plate for covering the mounting port is pivotally connected to the base.

Further, the second display comprises a display screen body and a support base supporting the display screen body.

Further, the support base comprises a fixed base mounted on the base and a support block supporting the display screen body, and the support block is pivotally connected to the fixed base.

Further, a rear side of an interface region between the base and the frame defines a mounting recess, and the fixed base is mounted at a bottom of the mounting recess.

Further, the docking station further comprises a router module configured to provide wireless connection function, wherein the router module is electrically connected with the mainboard, and the router module is mounted in the housing.

It is another object of the present application to provide a POS machine, comprising a card swiping device and the above-described docking station. The card swiping device is provided with a data socket for connection to the data plug of the docking station.

The docking station of the present application has at least the following advantages: compared with the prior art, in the present application, the housing is provided therein with the mainboard, the display device is mounted on the housing, meanwhile, the support detachably supporting the card swiping device is mounted on the housing, and the support is provided therein with the data plug; in this way, when the card swiping device is mounted on the support, the card swiping device can be electrically connected with the mainboard to enable data communication between the card swiping device and the mainboard, so that the function of the card swiping device can be expanded and the docking station of the card swiping device is formed. By using the support to support the card swiping device, the occupied space can be reduced, and the use is convenient.

The POS machine of the present application uses the above-described docking station, so that the card swiping device can be detached and thus the card can be swiped movably; meanwhile, the card swiping device can also be mounted on the support, the function of the card swiping device is therefore expanded, the cost is low, the occupied space is small, and the use is convenient.

BRIEF DESCRIPTION OF THE DRAWINGS

In order to more clearly illustrate the technical solution in embodiments of the present application, the following drawings, which are to be used in the description of the embodiments or the prior art, will be briefly described. It will be apparent that the drawings described in the following description are merely some embodiments of the present application. Other drawings may be obtained by those skilled in the art without paying creative labor.

Figure 1:
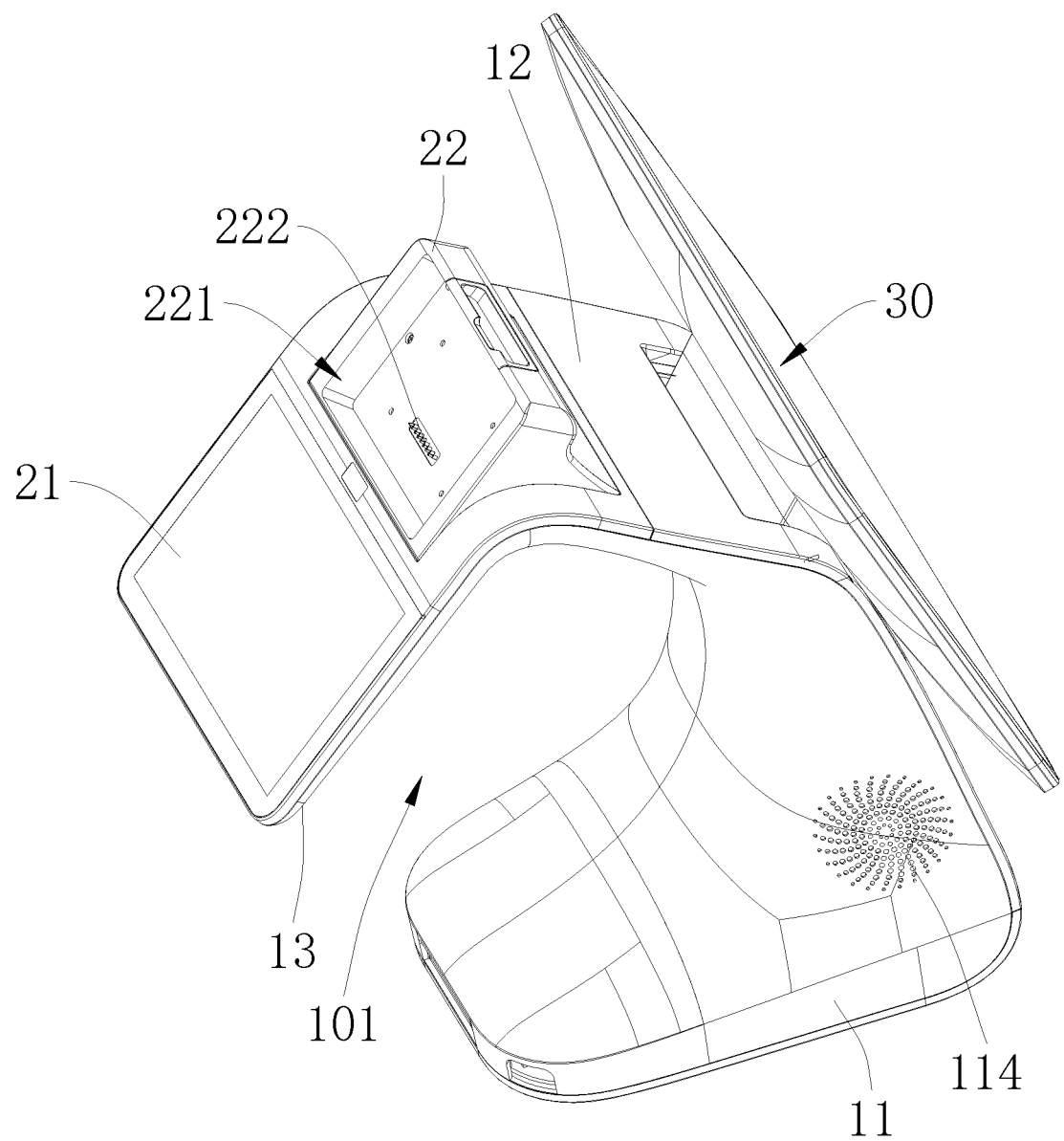
FIG. 1 is a first structural schematic view of a docking station provided by one embodiment of the present application.
Figure 2:
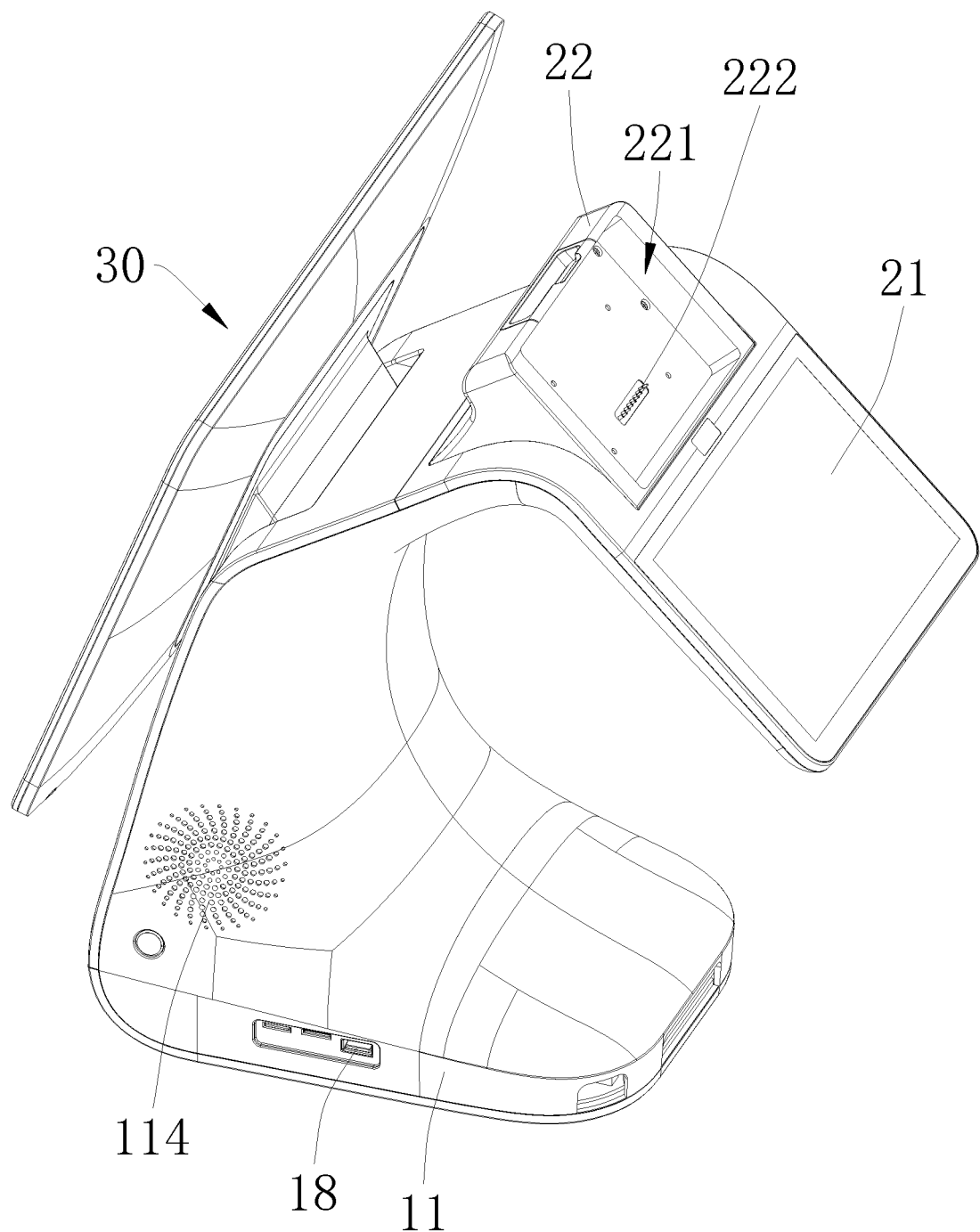
FIG. 2 is a second structural schematic view of the docking station provided by one embodiment of the present application.
Figure 3:
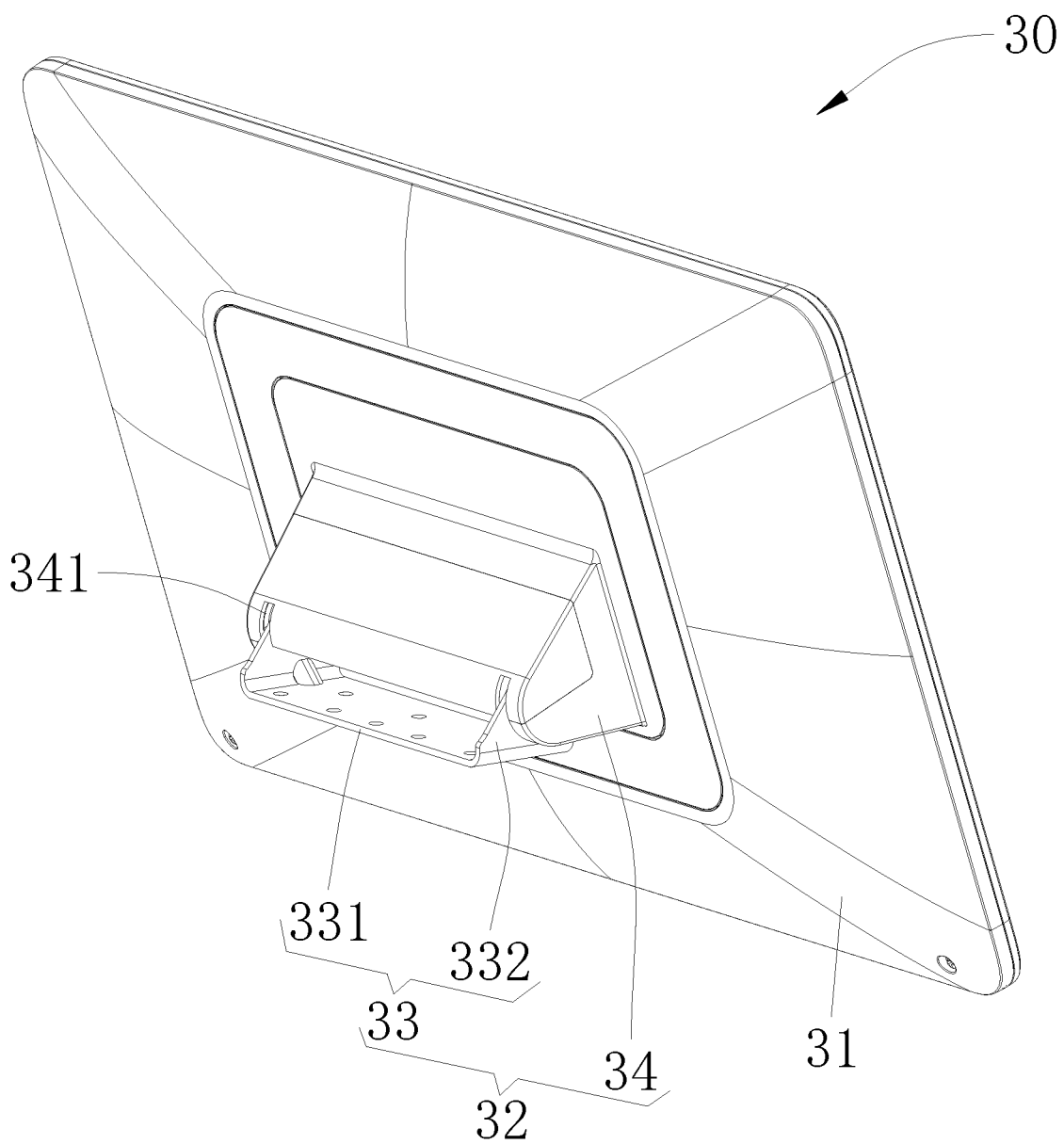
FIG. 3 is a structural schematic view of a second display of FIG. 2.
Figure 4:
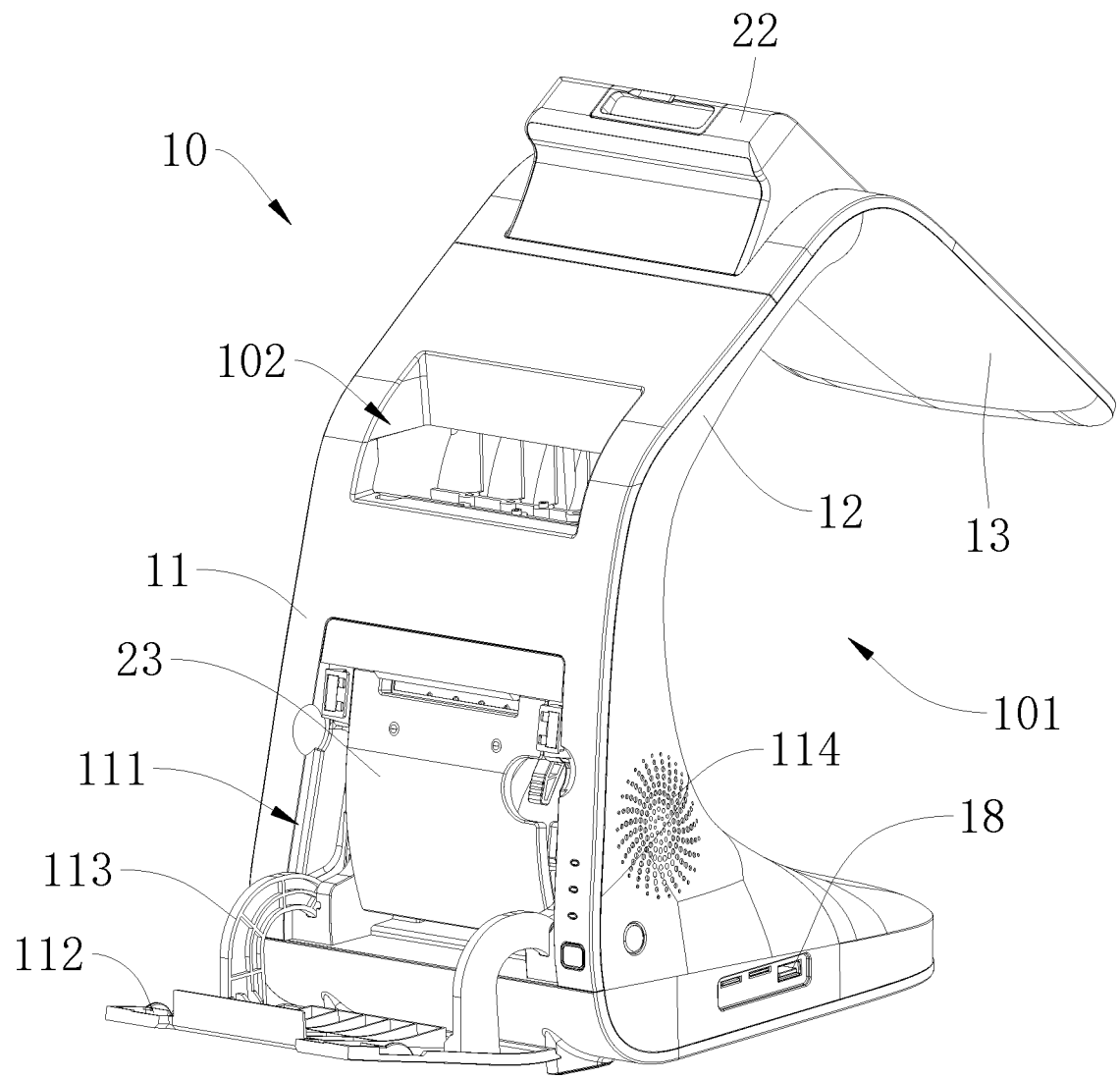
FIG. 4 is a structural schematic view of a base and a support of the docking station of FIG. 2.
Figure 5:
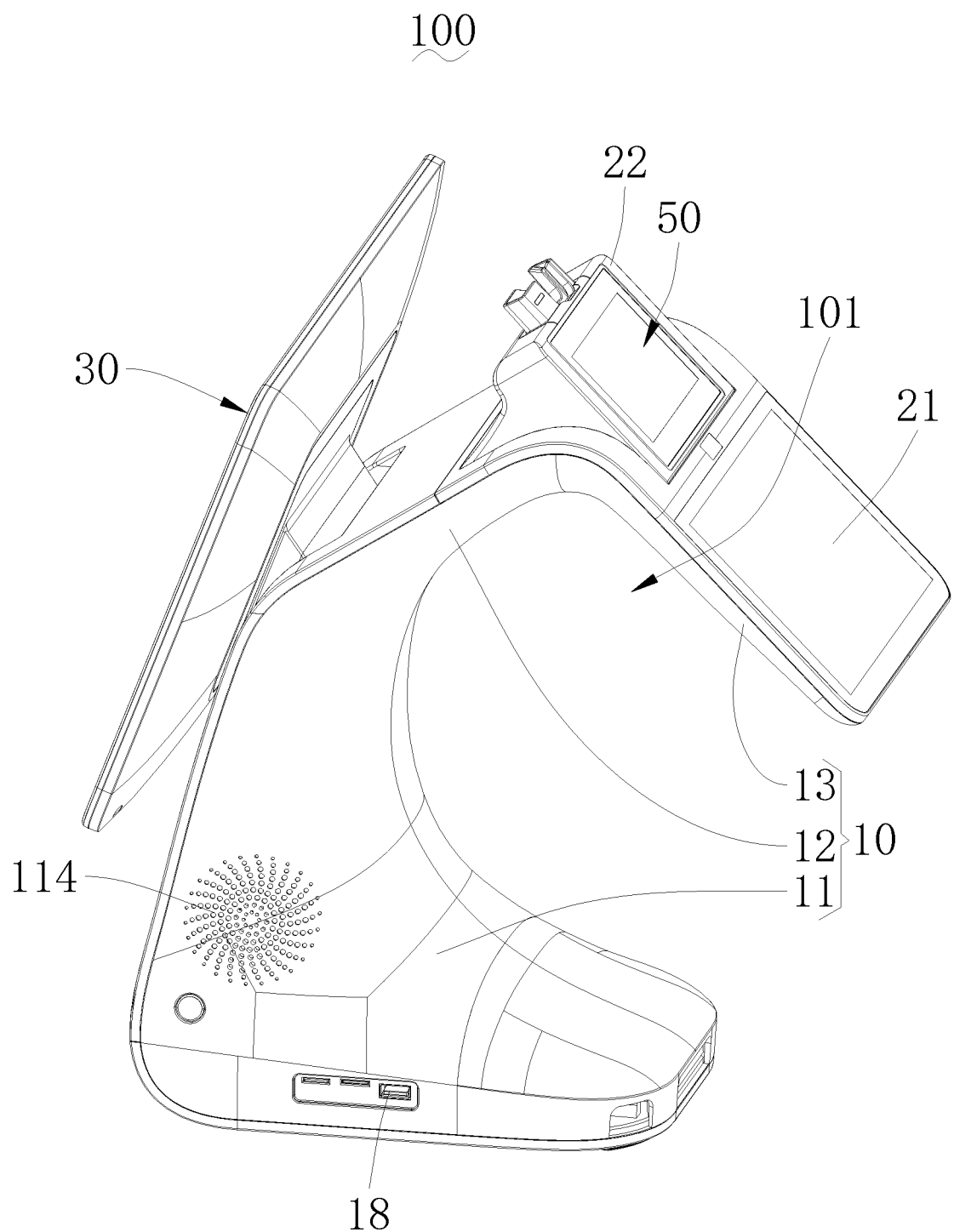
FIG. 5 is a first structural schematic view of a POS machine provided by one embodiment of the present application.

In the figures, the following numeral references are used: 100: POS machine; 10: Housing; 101: Arc-shaped opening; 102: Mounting recess; 11: Base; 111: Accommodation chamber; 112: Cover plate; 113: Arc-shaped strip; 114: Heat dissipation hole; 12: Frame; 13: Bracket; 18: Data communication interface; 21: First display; 22: Support; 221: Accommodation recess; 222: Data plug; 23: Printer; 30: Second display; 31: Display screen body; 32: Support base; 33: Fixed base; 331: Bottom plate; 332: Support plate; 34: Support block; 341: Open slot; 50—Card swiping device; 51: Casing; 511: Upper cover; 512: Bottom cover; 52: Positioning head; 521: Slit; 522: Notch; 523: Guide slot; 53: Circuit board; 531: Gold finger; 532: Data interface; 54: Card support; 541: Card slot; 542: Support plate; 543: Ribs; 55: Card reader; 561: Elastic piece; 56: Magnetic head; 562: Flexible circuit board; and 58: Display screen.

DETAILED DESCRIPTION OF THE EMBODIMENTS

In order to make the technical problems to be solved, the technical solutions, and advantages of the present application more clear, the present application will be further described in detail with reference to the accompanying drawings and embodiments. It should be understood that the embodiments described herein are only used to explain the present invention but are not intended to limit the present application.

It should be noted that when an element is referred to as being "fixed" or "arranged" on another element, it can be directly on another element or be indirectly on another element. When an element is referred to as being "connected" to another element, it can be directly connected to another element or indirectly connected to another element.

In the description of the present application, it should be understood that terms "length", "width", "thickness", "above", "beneath", "front", "rear", "left", "right", "vertical", "horizontal", "top", "bottom", "inner", and the like are based on the orientation or the positional relationship shown in the drawings, which is for the convenience of describing the present application and the simplified description, rather than indicating or implying that the device or element referred to must have a particular orientation or be constructed and operated in the particular orientation, and therefore these orientation or positional relationship should not be explained as limiting the present invention.

In addition, terms like "first" and "second" are only used for the purpose of description, and will in no way be interpreted as indication or hint of relative importance or implicitly indicate the number of the referred technical features. Thus, the features prefixed by "first" and "second" will explicitly or implicitly represent that one or more of the referred technical features are included. In the description of the present application, "multiple" or "a plurality of" refers to the number of two or more than two, except for clear and particular restriction.

In the description of the present application, it should be noted that, unless otherwise particularly stipulated or defined, terms "mounted", "connected", and "fixed" should be broadly interpreted as, for example, fixed connection, detachable connection, or permanent connection; mechanical connection or electrical connection; direct connected or indirect connection via media, or communication between inner parts of two elements or mutual action between two elements. For those skilled in the art, the specific meanings of the above terms in the present application may be understood based on specific situations.

Please refer to FIGS. 1-6, a docking station provided by the present application is now described as follows. The docking station comprises: a housing 10, a mainboard (not shown in the figures), a display device, and a support 22. The mainboard is mounted in the housing 10, the display device is electrically connected with the mainboard, the display device is mounted on the housing 10, the support 22 is mounted on the housing 10, and the support 22 is used for detachably supporting a card swiping device 50. The support 22 is provided therein with a data plug 222, when the card swiping device 50 is mounted on the support 22, the card swiping device 50 can be electrically connected with the data plug 222, so that the card swiping device 50 is further electrically connected with the mainboard for data communication with the mainboard, thereby realizing function expansion.

Regarding the docking station provided by the present application, when compared with the prior art, in the present application, the housing 10 is provided therein with the mainboard, the display device is mounted on the housing, meanwhile, the support 22 detachably supporting the card swiping device 50 is mounted on the housing 10, and the support 22 is provided therein with the data plug 222; in this way, when the card swiping device is mounted on the support 22, the card swiping device 50 can be electrically connected with the mainboard to enable data communication between the card swiping device 50 and the mainboard, so that the function of the card swiping device 50 can be expanded and the docking station of the card swiping device 50 is formed. By using the support 22 to support the card swiping device 50, the occupied space can be reduced, and the use is convenient.

Further, please refer to FIGS. 1-6, as one embodiment of the docking station provide by the present application, the support 22 defines therein an accommodation recess 221 to fittingly accommodate the card swiping device 50. By defining the accommodation recess 221 in the support 22, it is convenient to mount and fix the card swiping device 50; moreover, it is convenient to detachably mount the card swiping device 50 in the support 22. In the case that the card swiping device 50 is detachably mounted in the support 22, the card swiping device 50 can be detached for swiping cards, so that the use is more convenient.

Further, as one embodiment of the docking station provided by the present application, the data plug 222 is mounted on the housing 10, a bottom of the support 22 defines an opening for exposing the data plug 222 and allowing the data plug 222 to protrude into the support 22. This structure allows the support 22 and the data plug 222 to be separately mounted on the housing 10, thus being convenient for processing and fabrication. In other embodiments, the data plug 222 can also be provided on the bottom of the support 22. Further, the data plug 222 adopts a structure of telescope thimbles, so that the card swiping device 50 can be provided thereon with contacts, which is convenient to be connected with as well as detached from the data plug 222.

Further, as shown in FIGS. 1-6, as one embodiment of the docking station of the present application, the display device comprises a first display 21 and a second display 30. The first display 21 is electrically connected with the mainboard, and the first display 21 and the second display 30 are mounted on the housing 10. A front side of the housing 10 defines an arc-shaped opening 101 so as to reduce an occupied space, save material, and make the casing 51 have more beautiful appearance. Specifically, the housing 10 comprises: a base 11, a frame 12, and a bracket 13; the frame 12 bends and extends forwardly from an upper end of the base 11, and the bracket 13 inclinedly extends downwardly from a front end of the frame 12, so that the housing 10 forms the arc-shaped opening 101. The mainboard is mounted inside the base 11, the first display 21 is mounted on the bracket 13, and the second display 30 is mounted on the upper end of the base 11. Thus, it is convenient to mount and arrange the first display 21 and the second display 30, thereby reducing the occupied space. As the second display 30 is mounted on the upper end of the base 11, the first display 21 is mounted on the bracket 13, and the bracket 13 inclines and extends downwardly from the front end of the frame 12, it is convenient to support the first display 21 and convenient for persons in front of and behind the casing 51 to observe the contents displayed on the first display 21 and the second display 30, furthermore, such a structure enables a center of gravity of the docking station to be located at a geometry central area, which makes the support of the docking station be more stable. Further, the base 11 is tapered from bottom to top, and the front end of the base 11 is arc-shaped. More specifically, the base 11 is in a boot-like shape, which makes the base 11 be more stably supported on a table.

By forming the housing 10 by the base 11, the frame 12, and the bracket 13, forming the arc-shaped opening 101 at the front side of the housing 10, and mounting the first display 21 at the upper end of the base 11, while mounting the second display 30 on the bracket 13, it can be ensured that the casing 51 is stably supported on the table, and it is convenient for persons in front of and behind the casing 51 to observe the content displayed on the first display 21 and the second display 30; moreover, the layout of the structure can reduce the occupied space, thus being convenient to be used.

Further, as one embodiment of the docking station provided by the present application, a lower part of the base 11 comprises an accommodation chamber 111, a printer 23 is mounted in the accommodation chamber 111, and the printer 23 is electrically connected with the mainboard. The arrangement of the printer 23 facilitates printing consumption information in sale. While the arrangement of the accommodation chamber 111 in the lower part of the base 11 and the mounting of the printer 23 in the accommodation chamber 111 can effectively utilize the space within the base 11 and increase the weight of the base 11, such that the base 11 is more stable and therefore can stably support the first display 21 and the second display 30.

Further, as one embodiment of the docking station provided by the present application, a rear side of the base 11 defines a mounting port at a position corresponding to the printer 23, a cover plate 112 for covering the mounting port is pivotally connected to the base 11. By arranging the mounting port at the rear side of the base 11 and pivotally connecting the cover plate 112 to the base, it is convenient to mount the printer 23 and to replace a paper roll tape after the cover plate 112 is opened. Moreover, this structure can facilitate conveyance of a printed paper band out of the mounting port.

Further, as one embodiment of the docking station provided by the present application, a lower end of the cover plate 112 is pivotally connected to the base 11. By pivotally connecting the lower end of the cover plate 112 to the base 11, when the cover plate 112 is opened, the cover plate 112 can be supported on the table, which makes the cover plate 112 be more stable, thereby being convenient to replace the paper roll tape.

Further, as one embodiment of the docking station provided by the present application, two sides of the lower end of the cover plate 112 are respectively connected with arc-shaped strips 113, and free ends of the arc-shaped strips 113 are hinged with the base 11. This structure can increase an angle between the cover plate 112 and the base 11 when the cover plate 112 is opened, moreover, when the cover plate 112 is opened, the cover plate 112 is apart from the base 11, and the cover plate 112 is prevented from obstructing the mounting port, such that the paper roll tape is replaced more conveniently.

Further, two sides of the base 11 respectively define heat dissipation holes 114 for thermal dissipation.

Further, as one embodiment of the docking station provided by the present application, the base 11 is provided thereon with a data communication interface 18, and the data communication interface 18 is electrically connected with the mainboard. The arrangement of the data communication interface 18 facilitates data communication with other devices. The data communication interface 18 can be a USB interface for connecting with devices, such as a U disk. The data communication interface 18 can also adopt a network interface, an HDMI interface, etc.

Further, as one embodiment of the docking station provided by the present application, a router module is mounted inside the housing 10, and the route module is electrically connected with the mainboard. The arrangement of the router module is conducive to provide the router function and enables the user to perform wireless connection. Further, the data communication interface 18 can be plural, of which one is the network interface so that the router module is connected to an external network via the network interface. It should be understood that the router module can also be connected to the external network wirelessly. Specifically, the router module is mounted in the base.

Further, as one embodiment of the docking station provided by the present application, the second display 30 is a smart tablet electronic device, which can be a tablet computer, a smart phone, etc. The use of the tablet computer as the second display 30 is conducive to the mounting and replacement. Specifically, when the tablet computer is used as the second display 30, a hard protective jacket can be provided, the hard protective jacket is fixed on the base 11 and the tablet computer is accommodated in the hard protective jacket, so as to mount and fix the second display 30 conveniently.

Further, as one embodiment of the docking station provided by the present application, the first display 21 and the second display 30 are arranged, both the first display 21 and the second display 30 can be electrically connected with the mainboard, the first display 21 and the second display 30 are simultaneously controlled by a processor in the mainboard, such that the first display 21 and the second display 30 display the same content and receive separate input operation. It should be understood that the first display 21 and the second display 30 can be controlled by the processor of the mainboard to display different content, and to receive different input operation.

Further, as one embodiment of the docking station provided by the present application, when the second display 30 adopts the tablet electronic device, it can be used individually and display content different from the first display 21, and different contents can be input via the first display 21 and the second display 30. It should be understood that when adopting the tablet electronic device, the second display 30 can establish communication connection with the mainboard, and the display of the same contents and separate input operation by the first display 21 and the second display 30 can be realized.

Further, as one embodiment of the docking station provided by the present application, the second display 30 comprises a display screen body 31 and a support base 32 supporting the display screen body 31. By arranging the support base 32, it is convenient to support the display screen body 31, moreover, the support base 32 is mounted on the base 11, so that the display screen body 31 can be mounted on the base 11. Further, the support base 32 is pivotally connected to the base 11, so that the inclined angle of the display screen body 31 can be adjusted according to heights of different persons, thereby facilitating users' use.

Further, as one embodiment of the docking station provided by the present application, the support base 32 comprises a fixed base 33 and a support block 34, the support block 34 is pivotally connected with the fixed base 33, the fixed base 33 is mounted on the base 11, while the display screen body 31 is mounted on the support block 34; the display screen body 31 is supported by the support block 34, and the support block 34 is pivotally connected to the fixed base 33, such that the support block 34 is rotatable relative to the fixed base 33 so as to further adjust an inclination angle of the display screen body 31.

Further, as one embodiment of the docking station provided by the present application, the fixed base 33 is U-shaped, and the fixed base 33 comprises a bottom plate 331 and two support plates 332, the two support plates 332 are formed by respectively bending two ends of the bottom plate 331. A bottom of the support block 34 defines open slots 341 for allowing the two support plates 332 to be inserted therein, the support base 32 further comprises an pivotal axle (not shown in the figures) pivotally connecting the two support plates 332 to the support block 34. The fixed base 33 of such a structure is easy to be processed and fabricated, and can also be easily mounted and fixed on the base 11. The arrangement of the support block 34 makes the processing thereof convenient; while the arrangement of the open slot 341 on the support block 34 functions in protecting and preventing impurities from entering a rear of the display screen body 31.

Further, as one embodiment of the docking station provided by the present application, two sides of the support block 34 are obliquely arranged to be V-shaped. The arrangement of the obliquely V-shaped two sides of the support block 34 make the bottom of the support block 34 relatively narrow, which is convenient to be connected to the fixed base 33, furthermore, the fixed base 33 can be fabricated to be relatively small. In addition, a cross section of the support block 34 is triangular-shaped, which can support the display screen body 31 more stably. Further, the support block 34 adopts a shell structure, which is conducive to the mounting of the pivotal axle, so that the two support plates 332 are pivotally connected to the support block 34.

Further, as one embodiment of the docking station provided by the present application, a rear side of an interface region between the base 11 and the frame 12 defines a mounting recess 102, the fixed base 33 is mounted in a bottom of the mounting recess 102. By defining the mounting recess 102 on a rear side of the interface region between the base 11 and the frame 12, it is conducive for accommodation of the fixed base 33 and reduction of the occupied space.

Please refer to FIGS. 5-12, a POS machine is further disclosed by the present application, and comprises the card swiping device 50 and the docking station as described above, the card swiping device 50 is provided thereon with a data socket which is connected to the data plug 222 of the docking station. The card swiping device 50 can be detachably mounted on the docking station, the docking station is used to expand the function of the card swiping device so as to realize the function of a server, such as the function of display and confirmation of the consumption information. The POS machine of the present application uses the above-described docking station, so that the card swiping device 50 can be detached to realize the movable card swiping, meanwhile, the card swiping device 50 can also be mounted on the support 22, the function of the card swiping device 50 is therefore expanded and features low cost, small occupied space, and convenient use.

Figure 6:
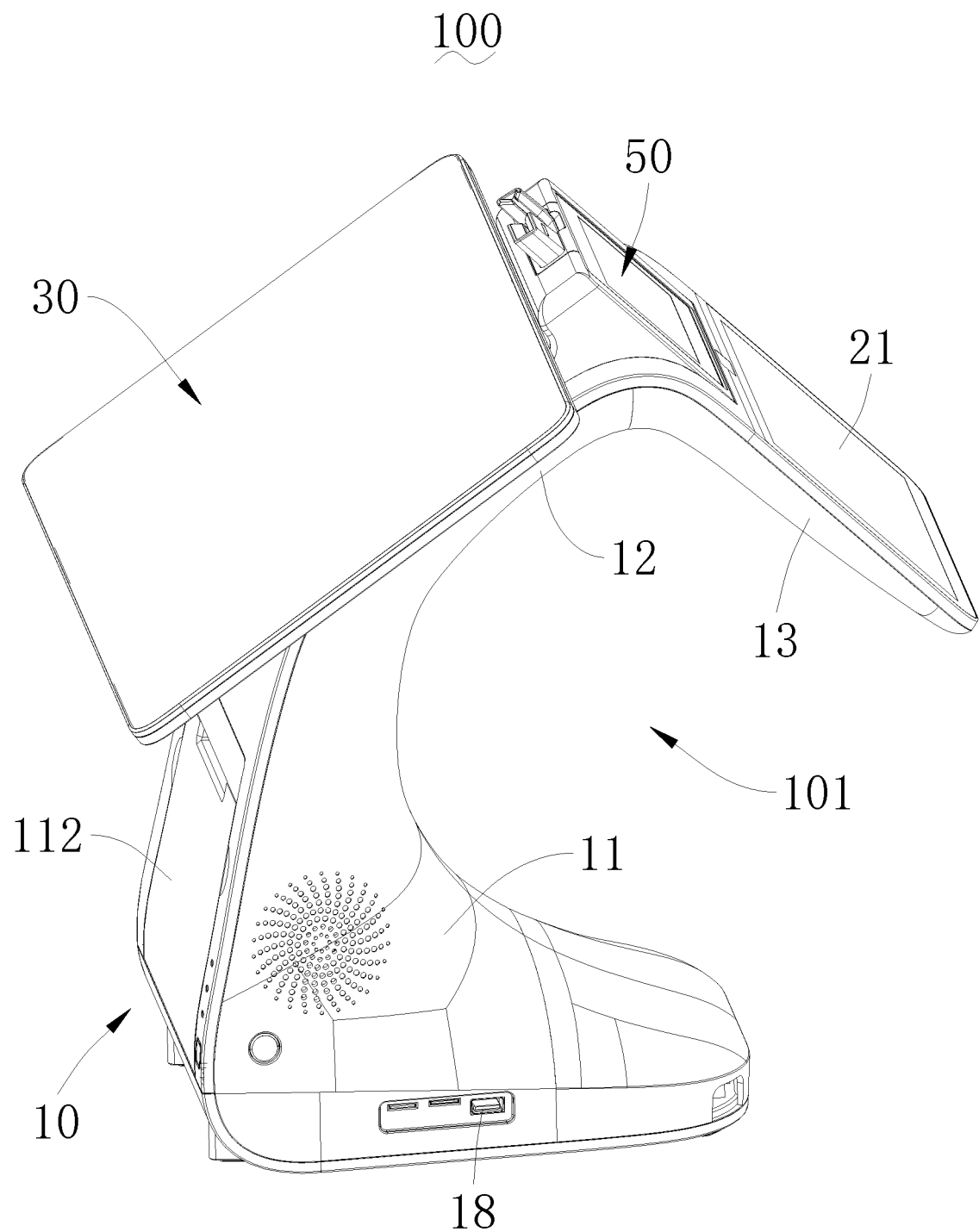
FIG. 6 is a second structural schematic view of the POS machine provided by one embodiment of the present application.
Figure 7:
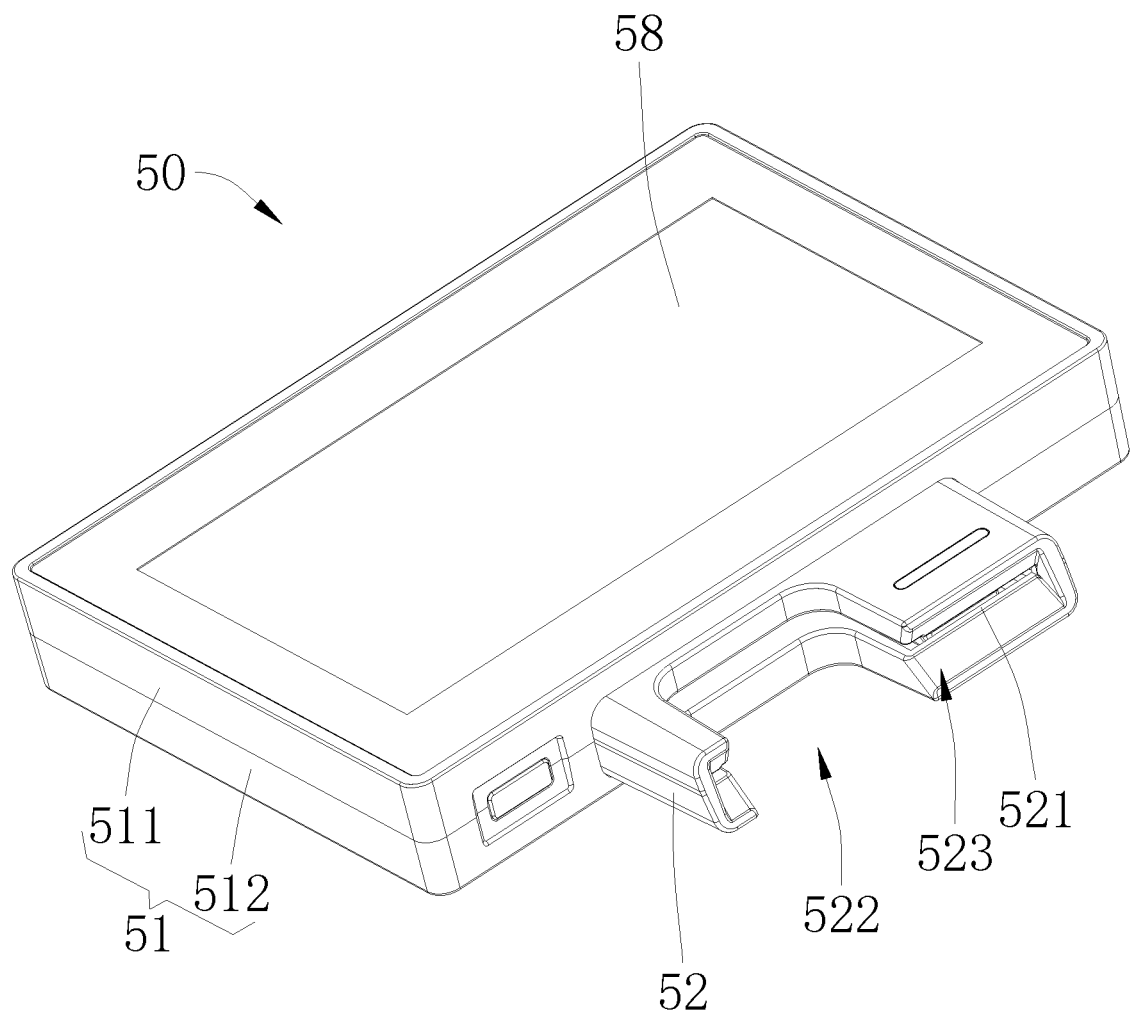
FIG. 7 is a first structural schematic view of a card swiping device of the POS machine of FIG. 6.
Figure 8:
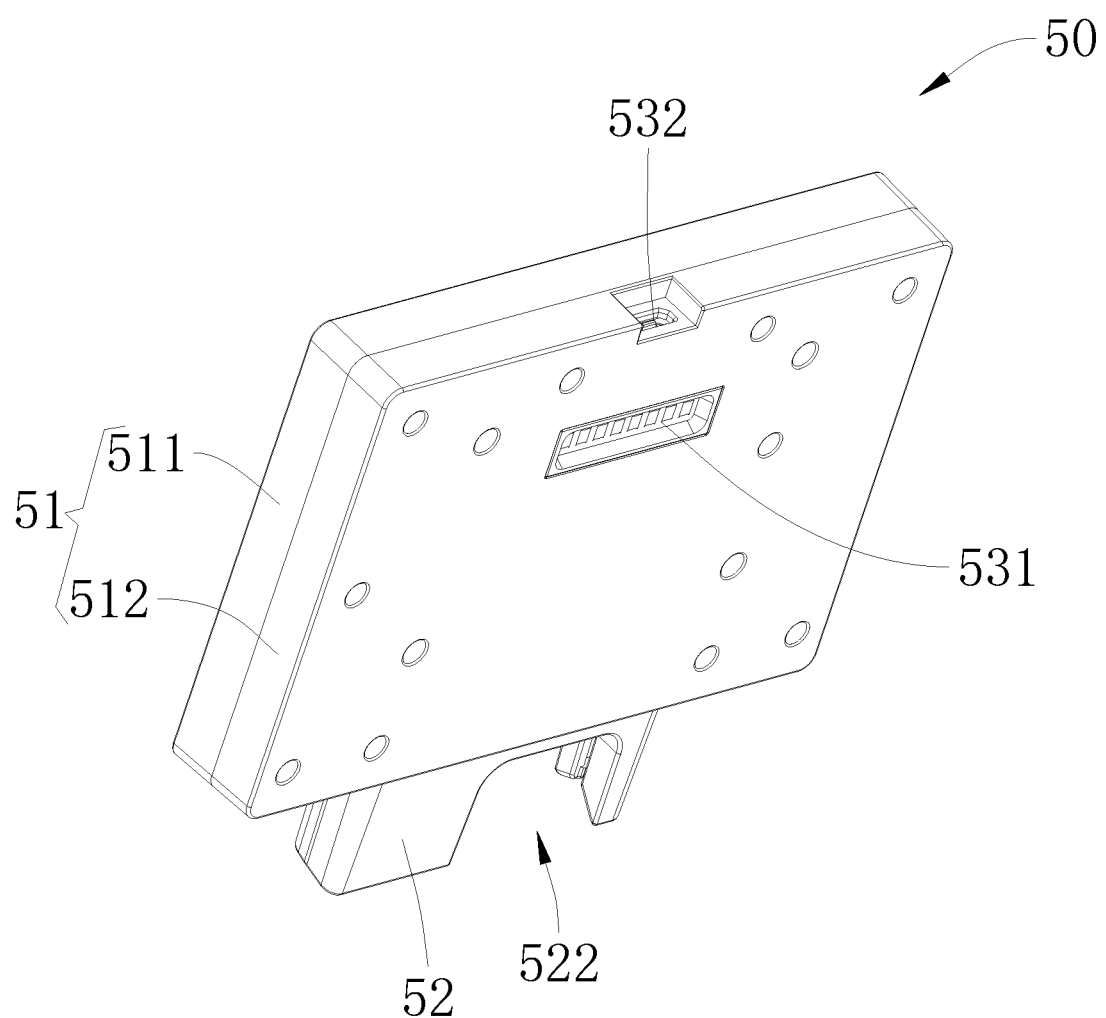
FIG. 8 is a second structural schematic view of the card swiping device of FIG. 7.
Figure 9:
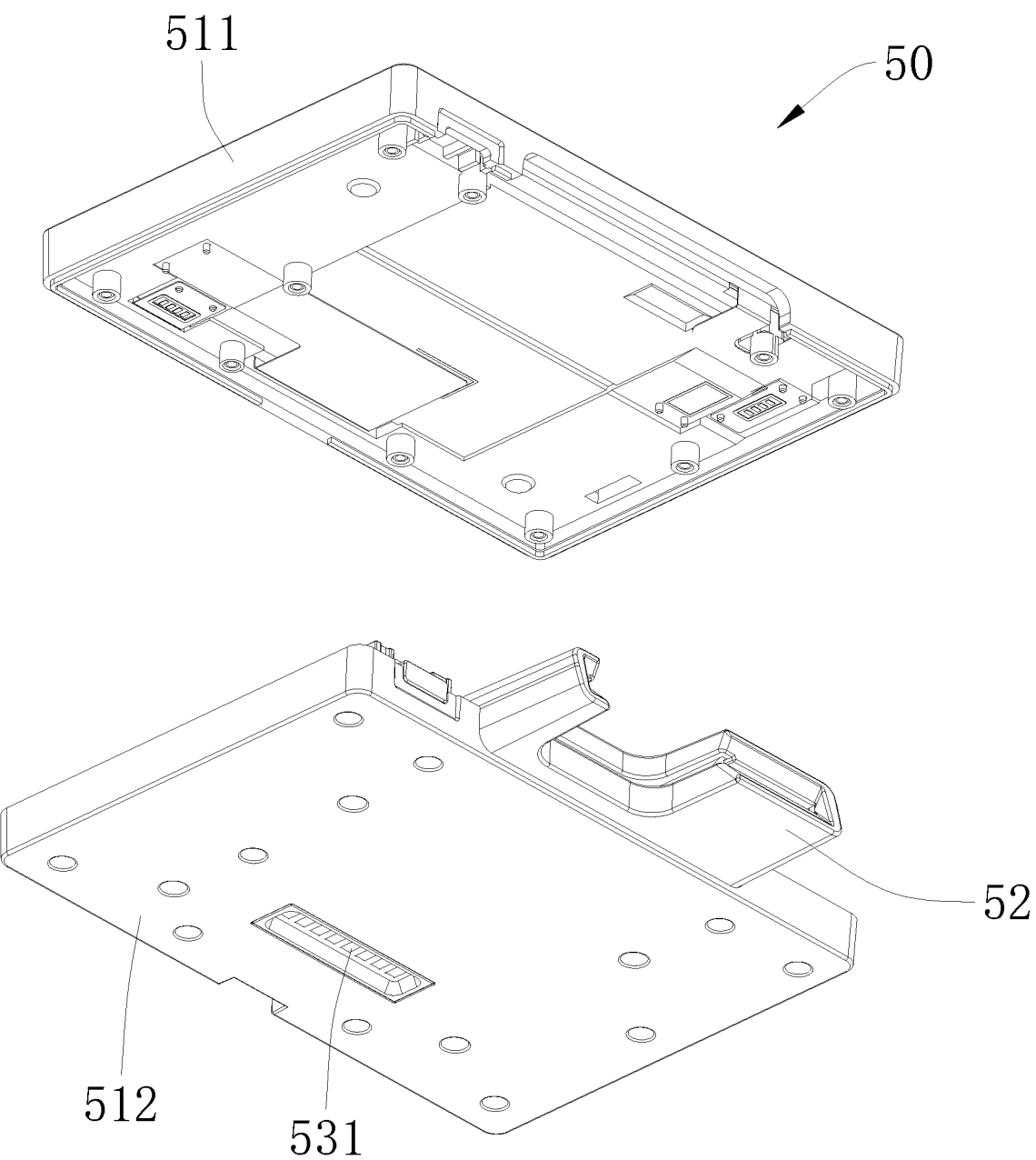
FIG. 9 is a first exploded structural schematic view of FIG. 7.
Figure 10:
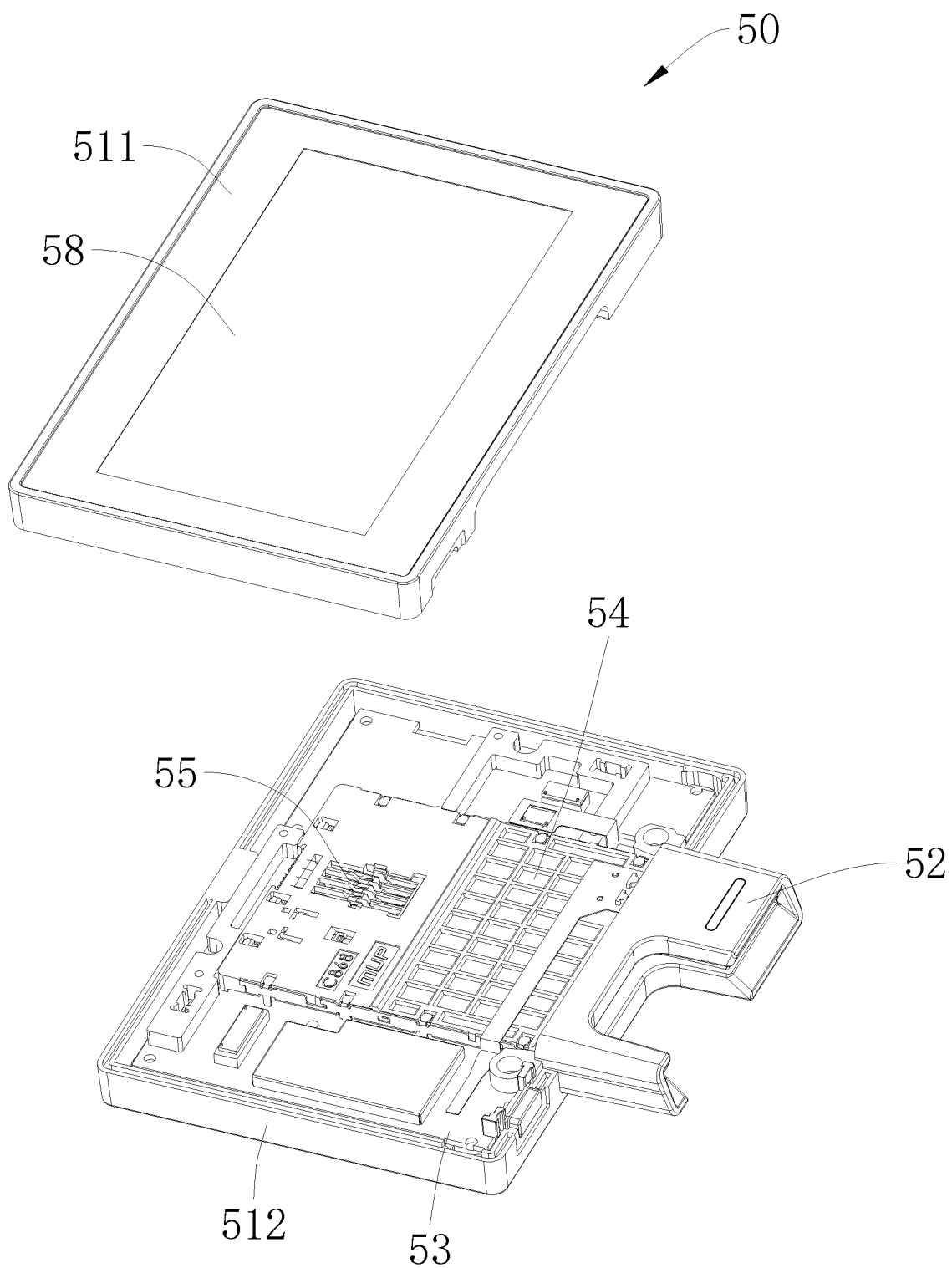
FIG. 10 is a second exploded structural schematic view of FIG. 7.
Figure 11:
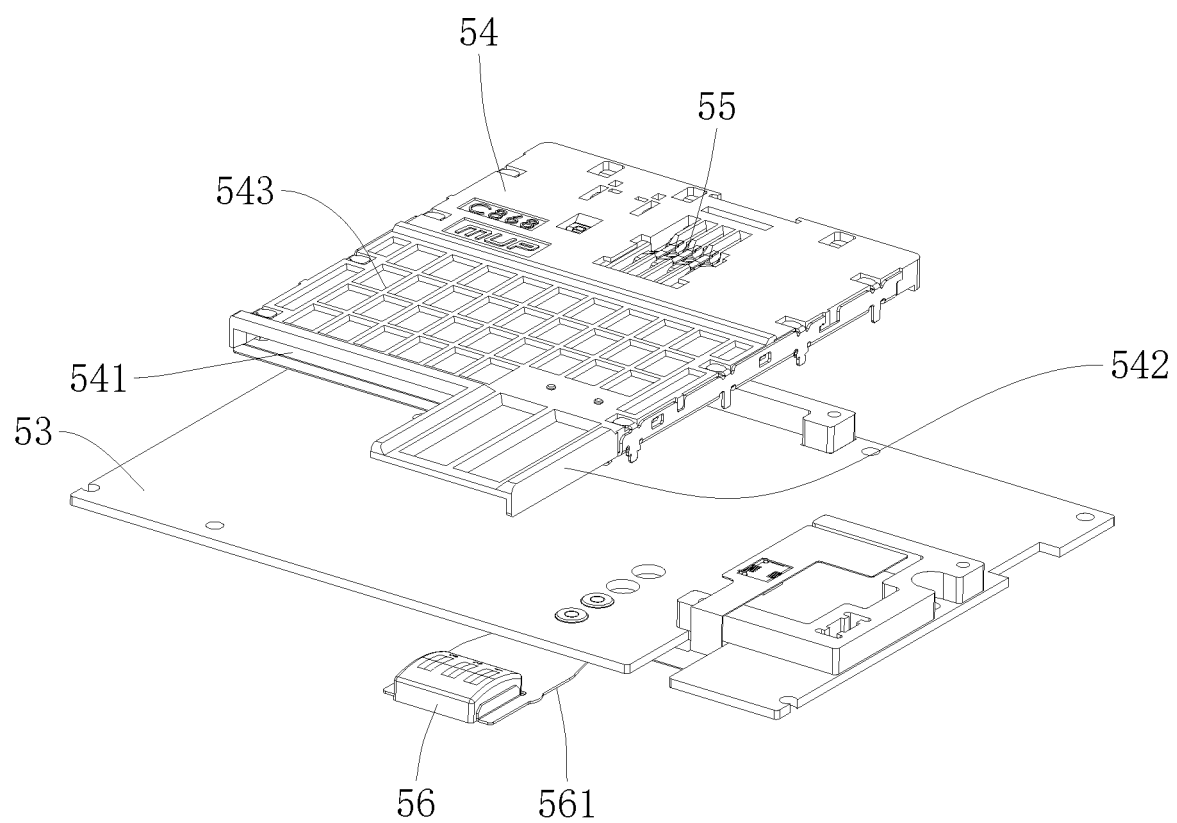
FIG. 11 is a first inner structural schematic view of the card swiping device of FIG. 10.
Figure 12:
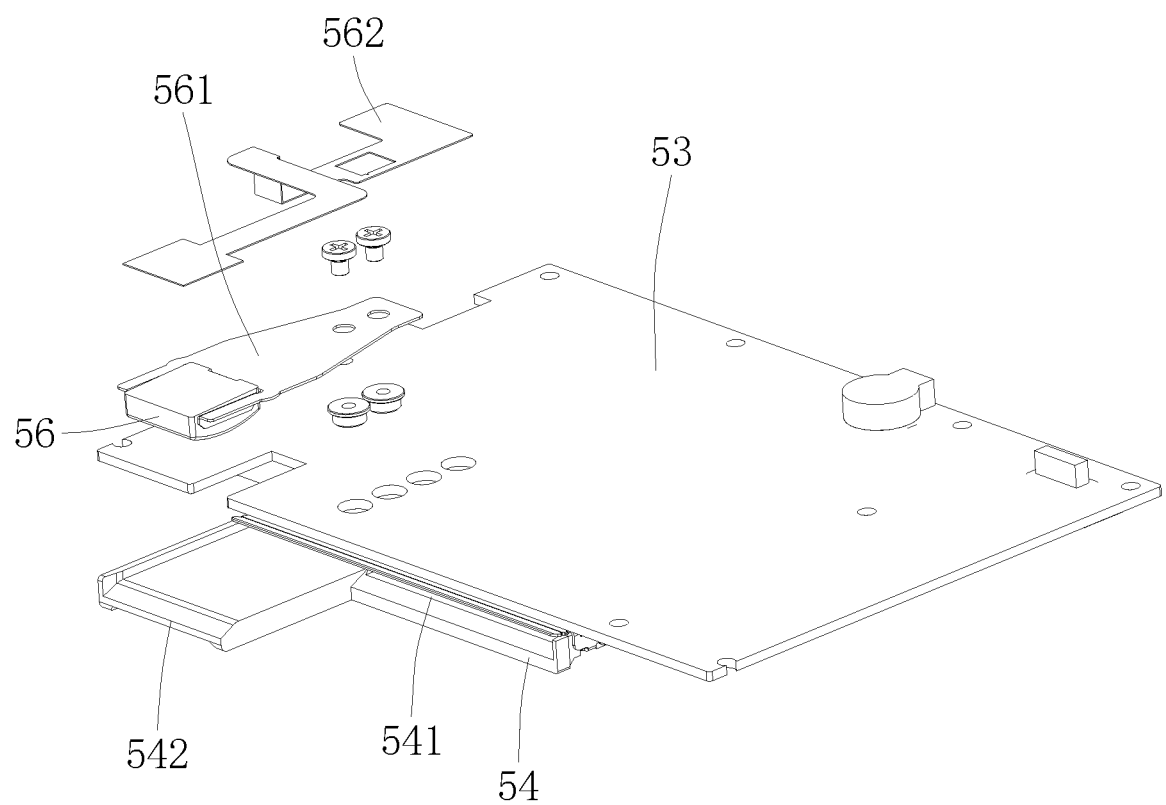
FIG. 12 is a second inner structural schematic view of the card swiping device of FIG. 10.

Further, please refer to FIGS. 1, 6, and 12, as one embodiment of the POS machine 100 provided by the present application, a bottom of the card swiping device 50 is provided with a gold finger 531 which is connected to the data plug 222. The data plug 222 is mounted in the support 22. Specifically, in this embodiment, the data socket is the gold finger 531. The gold finger 531 is arranged at the bottom of the card swiping device 50, when the card swiping device 50 is mounted on the support 22, the gold finger 531 contacts with the data plug 222, thereby realizing the electric connection between the card swiping device 50 and the mainboard. The card swiping device 50 is used for swiping cards, which enables customers to use cards including credit cards and member cards for payment during consumption.

Further, please refer to FIGS. 1, 6, and 12, as one embodiment of the POS machine 100 provided by the present application, the card swiping device 50 is mounted on an upper side of the frame 12, that is, the card swiping device 50 is located between the first display 21 and the second display 30, which is conducive to reduce the occupied space.

Further, as one embodiment of the POS machine 100 provided by the present application, the card swiping device 50 comprises: a casing 51, a circuit board 53, a magnetic head 56, a card reader 55, and a card support 54. The circuit board 53 is mounted inside the casing 51, the magnetic head 56 is used to read information of magnetic strip cards, the card reader 55 is used to read information of chip cards; the card support 54 is used to position the cards, and the cards can be the credit cards, bankcards, or member cards in the form of the magnetic strip card or the chip card. The card support 54 defines therein a card slot 541 allowing the card to be inserted in, the card support 54 is mounted inside the casing 51, the magnetic head 56 is electrically connected with the circuit board 53, the card reader 55 is mounted on the card support 54, the magnetic head 56 is disposed on the card support 54, a side of the casing 51 defines a first opening allowing the card to be inserted into the card slot 541, the gold finger 531 is electrically connected with the circuit board 53, a bottom of the casing 51 defines a second opening to expose the gold finger 531. By defining the card slot 541 on the card support 54, it is conducive for the insertion of the card into the card slot 541. By disposing the magnetic head 56 on the card support 54 and mounting the card reader 55 on the card support 54, when the chip card is inserted into the card slot 541, the information of the chip card can be read by the card reader 55; when the magnetic strip card is inserted into the card slot 541, the information of the magnetic strip card can be read by the magnetic head 56. Thus, the reading structure for the magnetic strip card and the reading structure for the chip card are integrated as a whole, which reduces the occupied space, and the card swiping device 50 can be fabricated to be much smaller, moreover, in use, it is not necessary to distinguish whether the card is a magnetic strip card or a chip card, making the use convenient.

Further, as one embodiment of the POS machine 100 provided by the present application, the card swiping device 50 further comprises a positioning head 52 for positioning the card. The positioning head 52 defines therein with a slit 521 for guiding and positioning the card, a rear end of the positioning head 52 is fixed in the first opening. The arrangement of the positioning head 52 can function in positioning when the card is inserted into the card slot 541 of the card support 54, thereby facilitating use.

Further, as one embodiment of the POS machine 100 provided by the present application, the card support 54 extends from a front section of the card slot 541 to form a support plate 542, and the magnetic head 56 is disposed on the support plate 542. Because it requires relatively long stroke when reading the information of the magnetic strip card, while the support plate 542 is arranged on the card support 54, and the support plate 542 is disposed on the magnetic head 56, the card support 54 can be designed to be relatively small, and the casing can therefore be designed relatively small, thus reducing the volume of the card swiping device 50.

Further, as one embodiment of the POS machine 100 provided by the present application, the magnetic head 56 and the support plate 542 extend into the positioning head 52, and the magnetic head 56 is located at one side of the positioning head. Such a structure allows the magnetic head 56 and the support plate 542 to extend into the positioning head 52, as the positioning head 52 is mounted on the casing, the volume of the casing 51 can be further minimized, so that the card swiping device 50 is fabricated to have a much smaller volume.

Further, as one embodiment of the POS machine 100 provided by the present application, the positioning head 52 defines a notch 522, and the notch 522 and the magnetic head 56 are respectively located at two sides of the positioning head 52. By arranging the notch 522 on the positioning head 52, it is convenient to insert a card into the positioning head 52; moreover, when the card is inserted into the card slot 541 of the card support 54, such a structure facilitates clamping the card at the notch 522 and further facilitates taking the card out.

Further, as one embodiment of the POS machine 100 provided by the present application, a front end of the positioning head 52 is provided with a guide slot 523, of which a width gradually reduces from the front to rear. Such a structure is conducive to insert the card into the slit 521 of the positioning head 52, and further guide the card into the card slot 541 of the card support 54.

Further, as one embodiment of the POS machine 100 provided by the present application, the card swiping device 50 further comprises an elastic piece 561 for supporting the magnetic head 56, one end of the elastic piece 561 is fixed on the circuit board 53, and the magnetic head 56 is mounted on another end of the elastic piece. By using the elastic piece 561 to support the magnetic head 56, when the card being inserted, the magnetic head 56 can be better attached to the card so as to read the information of the magnetic strip card.

Further, as one embodiment of the POS machine 100 provided by the present application, the card swiping device 50 further comprises a flexible circuit board 562 electrically connecting with the magnetic head 56 and the circuit board 53. The use of the flexible circuit board 562 connecting the magnetic head 56 with the circuit board 53 is conducive to the electrical connection of the magnetic head 56 and the circuit board 53, as well as the mounting and the layout of the magnetic head 56.

Further, as one embodiment of the POS machine 100 provided by the present application, the casing 51 comprises a bottom cover 512 and an upper cover 511 covering on the bottom cover 512, the card support 54 is mounted on the circuit board 53, and the circuit board 53 is fixed on the bottom cover 512. The casing 51 is formed by using the bottom cover 512 and the upper cover 511, thus being convenient to be processed and fabricated, meanwhile it is also convenient to mount the circuit board 53 and the card support 54. Moreover, by mounting the card support 54 on the circuit board 53 and fixing the circuit board 53 on the bottom cover 512, the casing 51 can be fabricated to have a relatively small thickness, thereby being convenient to be hold and used.

Further, as one embodiment of the POS machine 100 provided by the present application, the card swiping device 50 further comprises a display screen 58, the display screen 58 is mounted on a top side of the casing 51, and the display screen 58 is electrically connected with the circuit board 53. The arrangement of the display screen 58 on the casing 51 is conducive to display of the consumption information when swiping the card.

Further, the display screen 58 is a touch screen. Thus, when the card swiping device 50 is used for swiping card for consumption, it enables users to sign their names and input the consumption information.

Further, the top portion of the casing 51 defines a concave accommodation portion (not shown in the figures) configured to match with and mount the display screen 58. The arrangement of the concave accommodation portion is conducive to the mounting of the display screen 58, and at the same time can provide the functions of protecting lateral sides of the display screen 58.

Further, as one embodiment of the POS machine 100 provided by the present application, the card swiping device 50 further comprises a wireless module (not shown in the figures) for wireless communication, the wireless module is electrically connected with the circuit board 53. The wireless module is arranged, so that it is convenient to communicate when swiping the card.

Further, as one embodiment of the POS machine 100 provided by the present application, the card support 54 is provided thereon with a plurality of ribs 543. By arranging the ribs 543 on the card support 54, the strength of the card support 54 can be enhanced.

Further, as one embodiment of the POS machine 100 provided by the present application, the card swiping device 50 further comprises a data interface 532 that is electrically connected with the circuit board, a rear end of the casing 51 defines a third opening (not shown in the figures), the data interface 532 is mounted in a position corresponding to the third opening. By arranging the data interface 532, it is convenient for the card swiping device 50 to establish data communication with other electronic devices.

The aforementioned embodiments are only preferred embodiments of the present application, and are not intended to limit the present application. Any modification, equivalent replacement, improvement, and so on, which are made within the spirit and the principle of the present application, should be included in the protection scope of the present application.

What is claimed is:

1. A docking station, comprising: a housing, a mainboard mounted inside the housing, a display device mounted on the housing, and a support configured to detachably support a card swiping device; wherein the display device is mounted on the housing, the support is fixed to the housing, a data plug configured for connecting with the card swiping device is mounted in the support, and the data plug is electrically connected with the mainboard; the display device comprises a first display and a second display; the first display is electrically connected with the mainboard, and a front side of the housing defines an arc-shaped opening; the housing comprises: a base, a frame bending and extending forwardly from an upper end of the base, and a bracket inclinedly extending downwardly from a front end of the frame; the mainboard is mounted in the base, the first display is mounted on the bracket, and the second display is mounted on the upper end of the base.

2. The docking station of claim 1, wherein the support defines therein an accommodation recess configured to fittingly accommodate the card swiping device.

3. The docking station of claim 2, wherein a lower part of the base comprises an accommodation chamber, wherein a printer is mounted in the accommodate chamber, and the printer is electrically connected with the mainboard.

4. The docking station of claim 3, wherein a rear side of the base defines a mounting port at a position corresponding to the printer, and a cover plate for covering the mounting port is pivotally connected to the base.

5. The docking station of claim 2, wherein the second display comprises a display screen body and a support base supporting the display screen body.

6. The docking station of claim 5, wherein the support base comprises a fixed base mounted on the base and a support block supporting the display screen body, and the support block is pivotally connected to the fixed base.

7. The docking station of claim 6, wherein a rear side of an interface region between the base and the frame defines a mounting recess, and the fixed base is mounted at a bottom of the mounting recess.

8. The docking station of claim 2, further comprising a router module configured to provide wireless connection, wherein the router module is electrically connected with the mainboard, and the router module is mounted in the housing.

9. The docking station of claim 1, wherein a lower part of the base comprises an accommodation chamber, wherein a printer is mounted in the accommodate chamber, and the printer is electrically connected with the mainboard.

10. The docking station of claim 9, wherein a rear side of the base defines a mounting port at a position corresponding to the printer, and a cover plate for covering the mounting port is pivotally connected to the base.

11. The docking station of claim 1, wherein the second display comprises a display screen body and a support base supporting the display screen body.

12. The docking station of claim 11, wherein the support base comprises a fixed base mounted on the base and a support block supporting the display screen body, and the support block is pivotally connected to the fixed base.

13. The docking station of claim 12, wherein a rear side of an interface region between the base and the frame defines a mounting recess, and the fixed base is mounted at a bottom of the mounting recess.

14. The docking station of claim 1, further comprising a router module configured to provide wireless connection, wherein the router module is electrically connected with the mainboard, and the router module is mounted in the housing.

15. A POS machine, comprising a card swiping device, and the docking station of claim 1, wherein the card swiping device is provided with a data socket for connection to the data plug of the docking station.

* * * * *